Figure 1:
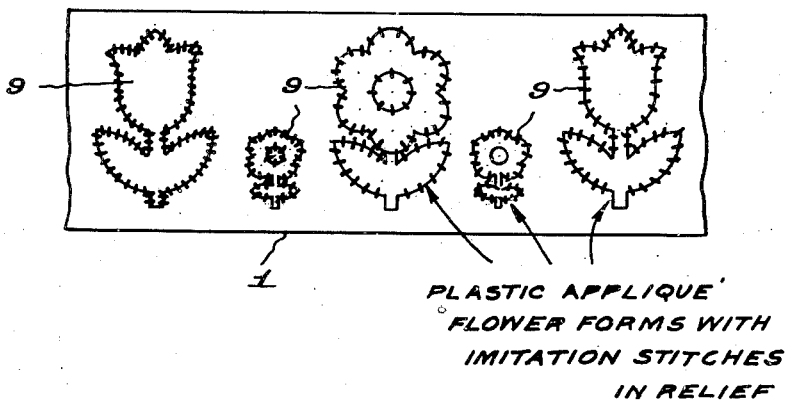

May 17, 1949.　　　　E. KARFIOL ET AL　　　　2,470,493

METHOD OF MAKING SHELF EDGING

Filed Nov. 25, 1944

PLASTIC APPLIQUE FLOWER FORMS WITH IMITATION STITCHES IN RELIEF

INVENTORS
EDWARD KARFIOL & WILLIAM A. ROEHM
BY
Cornelius Zalusia Pui
ATTORNEY

Patented May 17, 1949

2,470,493

UNITED STATES PATENT OFFICE 2,470,493

METHOD OF MAKING SHELF EDGING

Edward Karfiol, Great Neck, and William A. Roehm, Rockville Centre, N. Y., assignors, by mesne assignments, to Virtu, Inc., Brooklyn, N. Y., a corporation of New York Application November 25, 1944, Serial No. 565,154

4 Claims. (Cl. 154—97.5)

This invention relates to shelf edgings and other decorated articles of novel and unique character, so constituted that designs printed upon the flat surface of a base member are made to optically appear as applique in relief.

Conventional applique is accomplished by cutting out predetermined motifs of design from suitable material and attaching them in face abutting relation to an appropriate base material by stitches, adhesive or the like. Work of this kind is expensive and time consuming and lacks uniformity no matter how painstakingly it is performed. By the present invention we artificially obtain the effect of applique in an economical and efficient manner well adapted for commercial production of edging by the running yard.

In the preferred form of this invention we feed the strip of material, which is to form the base strip of the edging, into cooperative relation with appropriate printing apparatus which prints upon one surface thereof a predetermined design in one or more colors as may be desired. This strip may be of paper or any other suitable material such as cellulosic material or a synthetic resin plastic in sheet form.

After the strip is printed, as stated, it is passed into cooperative relation with plastic applying apparatus. This apparatus may partake of various forms but may conveniently comprise a roll dipping into a bath of semi-liquid plastic and provided on its periphery with cavities adapted to be charged with such plastic as the roll revolves in the bath. Above the surface of the bath is a suitable wiper or blade which removes all plastic from the surface of roll but leaves the cavities filled therewith so that, when the strip is passed beneath the roll and in contact therewith, the plastic in said cavities adheres to the said strip and is removed from the roll, to be carried along by and with the strip as the latter travels.

There are certain important factors that should be well observed, viz., the printing apparatus and the plastic applying roll should be so placed, synchronized and timed with respect to the strip and its travel that the applied plastic will be in register with the printed design. Also the plastic must have sufficient body or viscosity to substantially retain its shape and form, when deposited on the strip. Likewise the plastic employed should be transparent so that the printed design may be seen therethrough.

In carrying out the method of this invention, we use a plastic material, which may be thermoplastic, thermosetting or of any other appropriate character, but we preferably employ synthetic resins, such, e. g., as: cellulose acetate, cellulose acetate butyrate, acrylic resins, stearene resins, vinyl resins, urea resins, phenolic resins, etc. Heat may be used in the method where required to facilitate the application or setting of the resin employed.

In the accompanying drawing we have diagrammatically shown one method embodying the present invention, but the showing therein is to be understood as illustrative only and not as defining the limits of the invention.

Fig. 1 is a face view of an article made according to the present invention.

Figure 2:
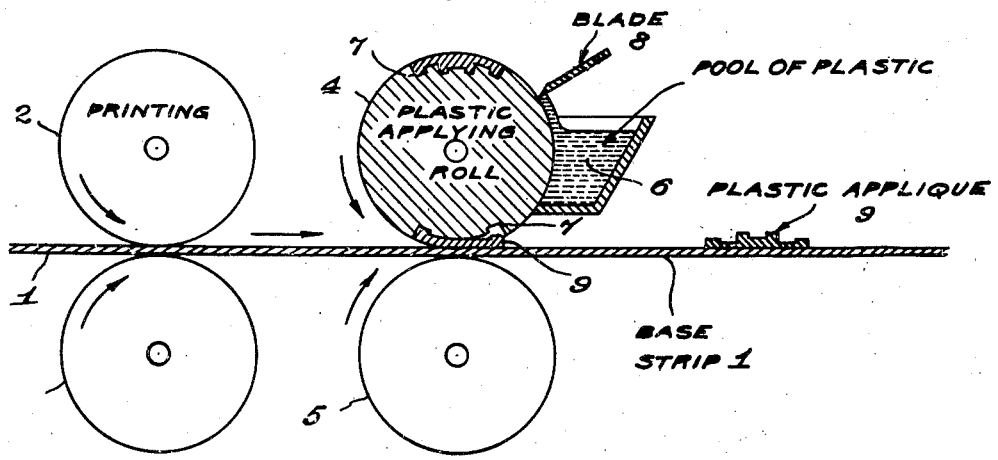

Figure 2 diagrammatically illustrates the preferred form of method of making the same.

In the showing of said drawing, the base strip 1 of any suitable material is fed from any suitable source of supply between printing rolls 2 and 3, which print the upper surface of strip with the predetermined design in one or more colors. From the rolls 2 and 3 the printed strip passes between a plastic applying roll 4 and a backup roll 5. The roll 4 dips into a pool 6 of plastic material of the character specified and charges the cavities 7 therein. As the roll 4 rotates the blade 8 removes all plastic from the circumference of the roll but leaves the cavities 7 filled so that the plastic therein is deposited, as a transparent plastic applique 9, upon the upper surface of strip 1 when brought into contact therewith. The exposed face of the transparent applique 9 will have a shape corresponding to the shape of the corresponding cavity 7.

The plastic applying roll 4 is so constituted, placed and timed with respect to the strip and printing roll 3, that there will be proper register between the printed design and the applied plastic applique 9.

A remarkable fact which results from the application of a transparent plastic applique in the manner described is that to all visible appearance, the flat printing on the surface of the strip, beneath such applique, looks as though it were at the surface of the latter. In other words it appears that the plastic applique actually carries the printed design on its surface, which, of course, is not so. This effect prevails where the structure is viewed from directly in front and persists even when viewed from quite a sharp angle—apparently due to the refraction of light in the plastic applique body. Thus we obtain the optical effect of a truly appliqued design although such design is in fact merely printed on the surface of the strip beneath the superimposed plastic.

In the drawing, the plastic body applique is shown as completely covering the printed design and extending entirely across the same. In practice, however, we may merely apply to the printed design, appliqued lines by depositing the body of plastic in the form of well defined lines which stand out boldly from the face of the base strip. For example, in leaf designs, the edges and veins of the leaves may be appliqued as stated and in imitation sewed designs, stitches may be likewise appliqued.

In the drawing, we have shown the printing and plastic applying operations as carried out by rolls, but they may be accomplished by flat plates or otherwise without departing from this invention.

Having thus fully described the invention, what we claim as new and desire to secure by Letters Patent is:

1. The herein described method which comprises: printing a design onto a surface of a base member, and then applying over at least a portion of said design a pre-formed transparent plastic applique which covers the same and registers therewith, whereby the covered portion of the printed design is visible through the thus applied transparent plastic applique.

2. The herein described method which comprises: printing a design onto a surface of a base member, molding a mass of plastic material while in liquid state into a predetermined shape and contour corresponding to at least a portion of the printed design, applying the thus formed plastic mass while in liquid state to the printed surface of the strip with the plastic mass in registration with the corresponding portion of the printed design, and thereafter bringing about solidification of said plastic mass to produce the optical effect of appliqued relief.

3. The herein described method which comprises: causing a web to travel, printing spaced repeats of a design on one surface thereof as it travels, molding further along the path of the web masses of transparent plastic material in liquid state of predetermined shape and contour corresponding to predetermined parts of said design repeats, and applying the thus formed liquid plastic masses to the web in registration with the corresponding parts of the design repeats as said web passes by, whereby, as said liquid masses solidify, said masses produce the effect of appliqued relief.

4. The herein described method which comprises: placing a colored design on the surface of a base member, molding a mass of transparent plastic material in liquid state into a predetermined shape and contour corresponding to at least a portion of said colored design, applying the thus molded transparent plastic mass while in liquid state to the corresponding portion of the colored design, and thereafter bringing about solidification of said plastic mass on the base member to produce the optical effect of appliqued relief with the colored design visible through the solidified transparent plastic.

EDWARD KARFIOL.
WILLIAM A. ROEHM.

REFERENCES CITED

The following references are of record in the file of this patent:

UNITED STATES PATENTS

| Number | Name | Date |
| --- | --- | --- |
| 1,450,367 | Hazeltine | Apr. 3, 1923 |
| 1,892,392 | Grupe | Dec. 27, 1932 |
| 2,046,000 | Sart | June 30, 1936 |
| 2,193,750 | Welker et al. | Mar. 12, 1940 |
| 2,268,890 | Mortensen | Jan. 6, 1942 |